United States Patent
Kranz et al.

(10) Patent No.: US 7,266,988 B2
(45) Date of Patent: *Sep. 11, 2007

(54) RESETTABLE LATCHING MEMS SHOCK SENSOR APPARATUS AND METHOD

(75) Inventors: Michael S. Kranz, Madison, AL (US); Arthur A. Jenkins, Madison, AL (US)

(73) Assignee: Morgan Research Corporation, Huntsville, AL (US)

( * ) Notice: Subject to any disclaimer, the term of this patent is extended or adjusted under 35 U.S.C. 154(b) by 200 days.

This patent is subject to a terminal disclaimer.

(21) Appl. No.: 11/201,485

(22) Filed: Aug. 11, 2005

(65) Prior Publication Data

US 2006/0220803 A1    Oct. 5, 2006

Related U.S. Application Data

(60) Provisional application No. 60/619,496, filed on Oct. 15, 2004.

(51) Int. Cl.
*G01M 7/00* (2006.01)
*G01N 3/30* (2006.01)
*G01N 3/32* (2006.01)
*G01P 15/00* (2006.01)

(52) U.S. Cl. .................................... 73/12.01

(58) Field of Classification Search ............. 73/12.01, 73/504.04, 514.32
See application file for complete search history.

(56) References Cited

U.S. PATENT DOCUMENTS

| | | | |
|---|---|---|---|
| 5,326,945 A | 7/1994 | Gotoh et al. | |
| 5,339,071 A | 8/1994 | Eckhaus | |
| 5,506,568 A | 4/1996 | Chen | |
| 5,970,794 A | 10/1999 | Yoshida | |
| 6,148,670 A * | 11/2000 | Judy | 73/514.32 |
| 6,314,887 B1 | 11/2001 | Robinson | 102/262 |
| 6,514,781 B2 | 2/2003 | Chang et al. | 438/19 |
| 6,549,107 B2 | 4/2003 | Lim et al. | 335/78 |
| 6,619,123 B2 | 9/2003 | Gianchandani et al. | |
| 6,737,979 B1 * | 5/2004 | Smith et al. | 340/665 |
| 7,038,150 B1 * | 5/2006 | Polosky et al. | 200/61.45 R |
| 7,148,436 B1 * | 12/2006 | Lee et al. | 200/61.48 |
| 7,159,442 B1 * | 1/2007 | Jean | 73/12.01 |
| 7,194,889 B1 * | 3/2007 | Jean et al. | 73/12.04 |
| 2003/0020062 A1 | 1/2003 | Faris | 257/40 |
| 2005/0146504 A1 * | 7/2005 | Huang et al. | 345/163 |

OTHER PUBLICATIONS

Geear et al, Microengineered Electrically Resettable Circuit Breaker, Journal of Microelectromechanical Systems, vol. 13, No. 6, Dec. 2004.*

* cited by examiner

*Primary Examiner*—Michael Cygan
*Assistant Examiner*—Octavia Davis
(74) *Attorney, Agent, or Firm*—Paul F. McQuade; Greenberg Traurig, LLP

(57) ABSTRACT

The Resettable Latching MEMS Shock Sensor provides the capability of recording external shock extremes without consuming electrical power. The device incorporates a shock sensitive suspended proof mass, spring-loaded contacts, latches, and actuators for device reset. The device can be designed, hardwired, or programmed to trigger at various shock levels. The device can be fabricated in a simple micromachining process that allows its size to be miniaturized for embedded and portable applications. During operation, the device consumes no quiescent power. The device can be configured to close a circuit, switch an interrupt signal, or switch some other electrical trigger signal between devices at the time of a shock extreme being reached, or it can be configured to latch and be polled at some time after the shock limit has occurred.

25 Claims, 9 Drawing Sheets

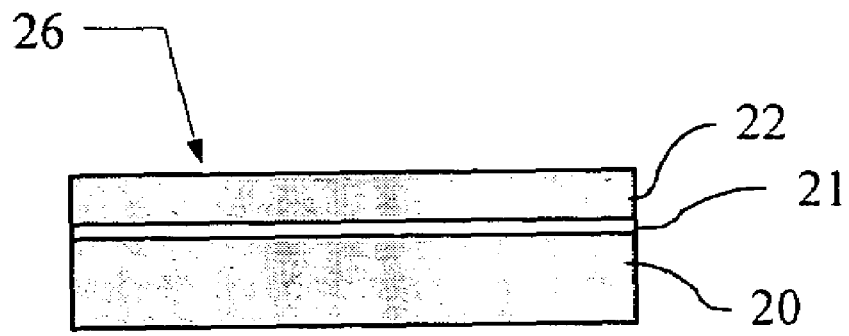
Figure 2B
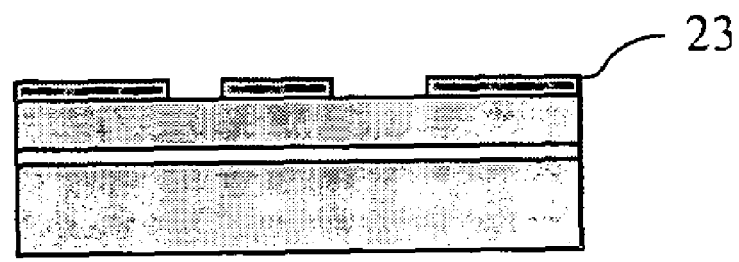
Figure 2C
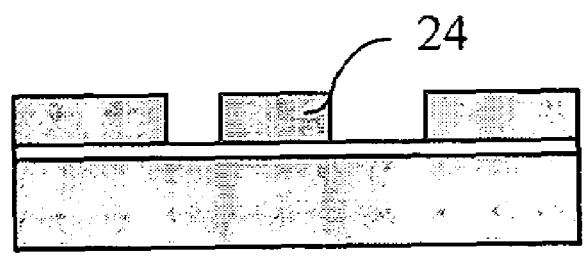
Figure 2D
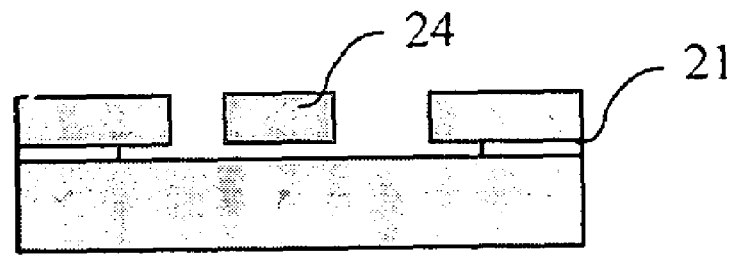
Figure 2E
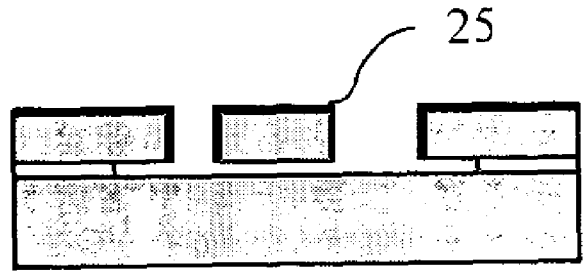
Figure 2F
Figure 2B-2F

RESETTABLE LATCHING MEMS SHOCK SENSOR APPARATUS AND METHOD

REFERENCE TO RELATED APPLICATIONS

This application claims priority to Provisional Patent Application U.S. Ser. No. 60/619,496, entitled "Resettable Latching MEMS Shock Sensor" and filed on Oct. 15, 2004, which is fully incorporated herein by reference.

GOVERNMENT LICENSE RIGHTS

This invention was made with Government support under contract MDA972-03-C-0010, awarded by the Defense Advanced Research Projects Agency ("DARPA"). The Government has certain rights in the invention.

BACKGROUND

1. Field of the Invention

The present invention relates generally to a shock sensor and method for monitoring shock. More particularly, the present invention relates to a low-power and unpowered micro-electromechanical shock sensor using a micromechanical suspended proof mass structure.

2. Background of the Invention

Embedding miniature sensors in products, systems, storage and shipping containers, and other items allows the monitoring of those items to determine health, maintenance needs, lifetime, and other item characteristics. Information from miniature shock sensors can tell a user whether the item has been exposed to shock levels that can cause damage. In addition, miniature shock sensors can be used to "wake up," from a low-power sleep mode, a more sophisticated sensing system to collect a more complete set of environmental data.

Current battery-powered embedded sensor systems that perform this type of monitoring often require a low power method of determining when a certain level of shock has been reached. Many other applications, such as in transportation and shipping monitoring, heating and air conditioning, and food storage, would benefit from the ability to monitor the shock environment with a completely unpowered sensor. In addition, these applications would benefit from the ability to poll that sensor to determine if a shock extreme was reached, and then reset the sensor for later use. In either case, an ultra-low power sensor, or even a sensor that consumes no quiescent power, would reduce the overall system power consumption enough to allow embedded sensors to operate for many years in portable battery powered applications, or in systems that scavenge small amounts of power from the environment.

Low power and unpowered shock sensors currently exist. However, they are large-scale devices such as the catches used in automotive seat belts. These devices operate in a similar fashion and provide a similar function as the present invention, but are not in a form factor suitable for integration with microdevices, and are not fabricated using techniques that are compatible with microelectronics or micro-electromechanical systems ("MEMS") devices.

Micro-scale shock sensors, in the form of accelerometers, exist as well, but most of the previous work to develop low-power shock sensors has been focused on minimizing the power consumption of standard miniature devices, and using low-power analog electronics to determine when a specific shock level has been reached. Devices and systems would then create a low-impedance logic level signal for input to a sleeping microcontroller. The fundamental problem is that such a system must continuously power the sensor and analog trigger circuitry, creating a constant power draw on the batteries. Even using the latest in low-power devices and highest capacity batteries, systems that continuously power any sensor will only operate for 5-10 years.

As embedded miniature sensors get smaller, and as batteries are reduced in size and capacity, the use of lower power and unpowered devices will become more critical. Furthermore, maximizing the sensor functionality, without increasing power consumption, will enhance the capability of embedded sensing systems.

Other inventions have used suspended proof mass micromachined devices to measure shock, and for switching, but, until the present invention, only one as had the advantages of the present invention in combining low- or no-power operation with a mechanical latching function. U.S. Pat. No. 6,737,979 discloses a MEMS shock sensor that achieves the goals of low- and no-power operation of a mechanical shock sensor with a mechanical latching function. In this prior art invention, as in the present invention, a moveable proof mass and a latching means are formed on the surface of a substrate. When the sensor is subject to a sufficient shock, the proof mass moves and latches with the latching means, and the latched condition is detected by external circuitry.

The present invention offers several improvements to the technology disclosed in U.S. Pat. No. 6,737,979 ("the '979 invention"). First, in the '979 invention, each separate device design can detect only one range of shock level because the distance between the proof mass and the latch is not variable. In the present invention, the latching distance is variable and a sensor can therefore be programmed to detect varying shock levels. Second, in the '979 invention, the only electrical contact made between the proof mass and the latch to detect a shock level is through the latch itself. As is discussed in detail below, the present invention offers a contact that is separate from the latch so that a "triggering" condition (i.e., the proof mass contacting with the contact) can be made (and detected) prior to latching, if desired by the user. With this feature, the present invention can be programmed to detect a shock level smaller than that of the latching shock level. Third, although the '979 invention offers an unlatching function so that the sensor can be re-used, the present invention improves upon this function with a mechanical linkage that applies no load to the latch during latching, thereby decreasing the necessary latching force and increasing the sensitivity of the sensor.

SUMMARY OF THE INVENTION

It is therefore an object of the present invention to provide a low-power micro-machined shock sensor in which the sensitivity of the sensor can be adjusted.

It is another object of the present invention to provide a low-power micro-machined shock sensor which allows for detection of a shock level separate from and variable from the latching function (i.e., a triggering event separate from a latching event).

It is yet another object of the present invention to provide a micromachined shock sensor with an unlatching apparatus that does not apply a mechanical load on the latch during latching.

The present invention achieves these objectives with a micromachined proof mass connected to a substrate through micromachined flexures. The proof mass includes a contact area and a latching area. The contact area and latching area register respectively with spring-loaded contacts and a spring-loaded latch that are anchored to the substrate. Under a shock load of sufficient magnitude, the proof mass displaces to bring the contact area together with the spring-loaded contacts and to force the latch on the proof mass to engage with the spring-loaded latch. After latching, the contacts remain closed, allowing a voltage source to be connected to the input of a microcontroller, or allowing the completion of an external circuit. A thermal, capacitive, or other actuator can then be used to disengage the latch and return the proof mass to its original position. The sensor will use nearly zero power except when actually providing the trigger signal to the microcontroller or during any reset operation. The sensor can remain latched for interrogation at a later date, even if system power is lost, and the sensor can be reset to detect the next event.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

DESCRIPTION OF THE DRAWINGS

FIGS. 2B-2F illustrate steps in the process of fabricating one embodiment of the present invention.

Figure 1:
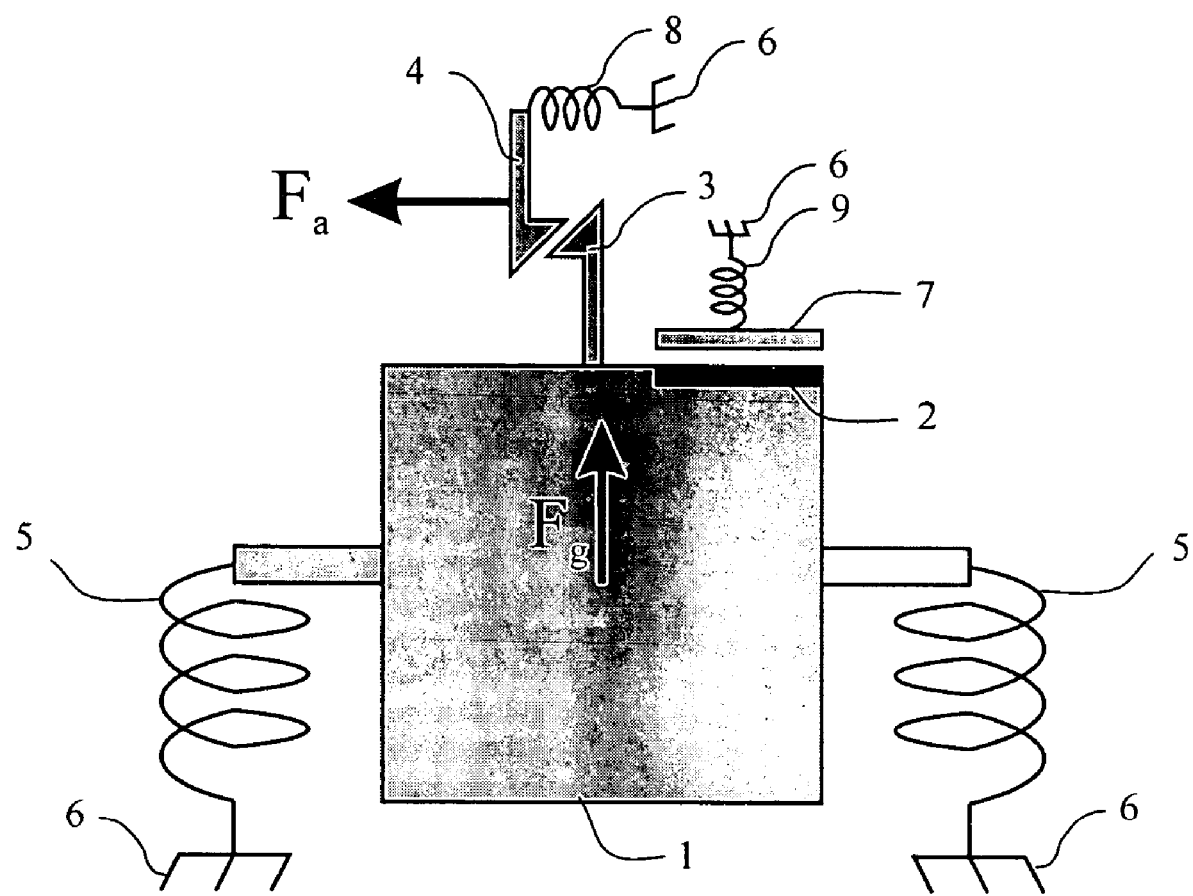
FIG. 1 is a schematic diagram of the shock sensor and its components.

Repeat use of reference characters throughout the present specification and appended drawings is intended to represent the same or analogous features or elements of the invention

DETAILED DESCRIPTION

The illustrated embodiment of the invention is fabricated in a thick layer of silicon or other conductor material that has been released from a rigid substrate. Within this thick layer of material, a proof mass, a set of flexures, multiple contacts, multiple latch and pawl structures, multiple actuators, and multiple anchors and pads are fabricated.

FIG. 1 illustrates a schematic diagram of one embodiment of the invention. The invention utilizes a micromachined proof mass structure 1 attached to the substrate (not illustrated) via anchors 6 through proof mass flexures 5. The proof mass structure 1 includes a contact area 2 and a latch 3. Under a shock load, the inertia of the proof mass yields a force, $F_g$, that displaces the mass sufficiently to force the latch 3 to engage with a similar latch on a thin pawl 4 attached to the substrate via anchor 6 through pawl flexure 8. The force also causes the proof mass contact area 2 to connect with the contact 7 that is attached to the substrate via anchor 6 through contact flexure 9. After latching, the contacts remain closed, and the shock sensor can then be interrogated by external circuitry (not illustrated). A thermal, capacitive, or other actuator (discussed below) can be used to develop a force, $F_a$, and disengage the pawl 4 and return the proof mass 1 to its original position.

Figure 2A:
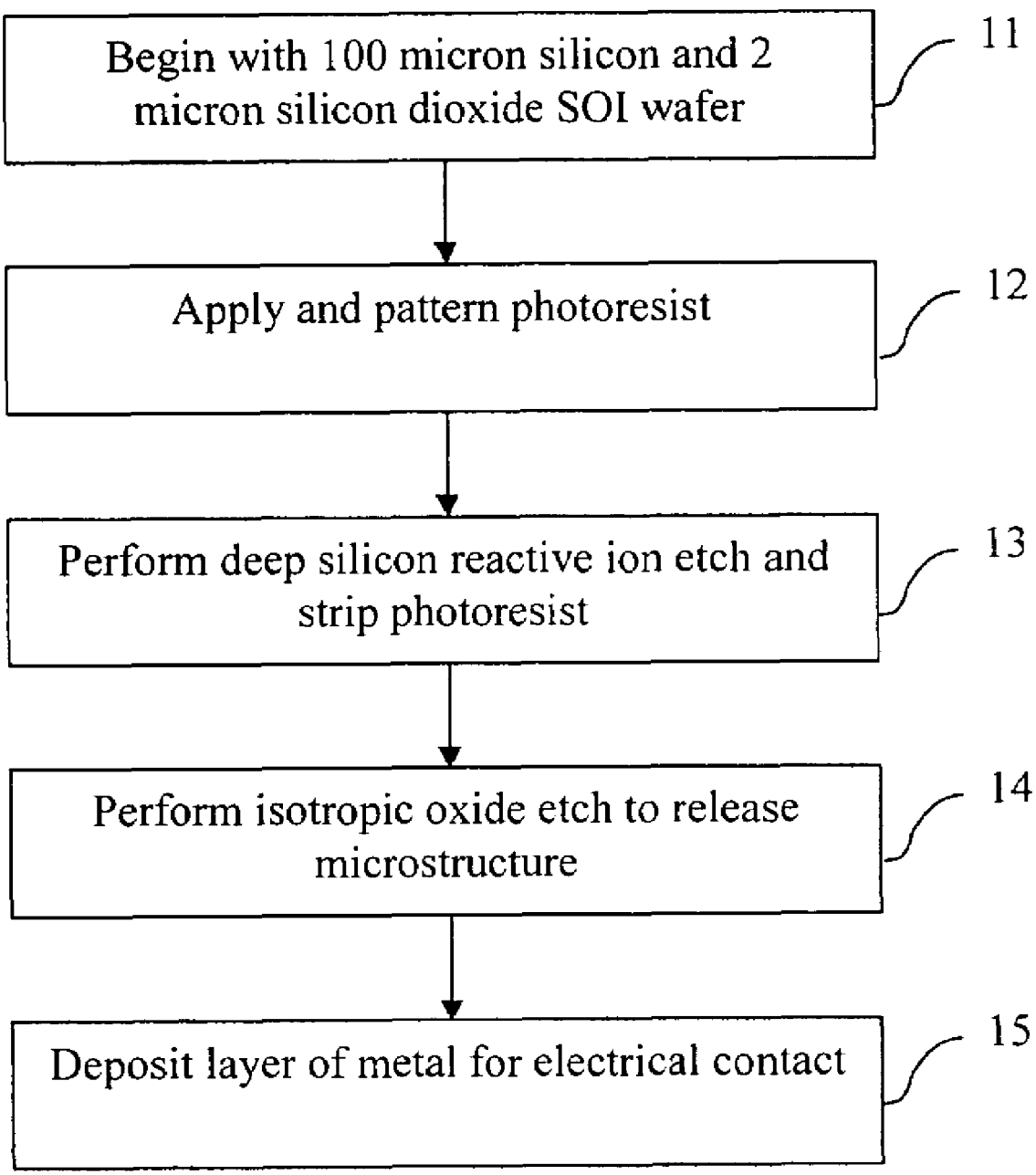
FIG. 2A is a high-level flowchart for an embodiment of a process according to the present invention.

FIG. 2A illustrates the high-level process flow for the process used to fabricate the suspended proof mass structure that is used in one embodiment of the invention. While the following discussion focuses on producing a silicon structure with the process discussed herein, other combinations of materials and other processes can be employed.

Employing the process of FIGS. 2B and 2C, the starting material is a silicon-on-insulator ("SOI") wafer 26 with a handle layer 20 and a 100-micron thick active silicon layer 22 separated by a 2 micron thick silicon dioxide layer 21. With attention to FIG. 2C, which illustrates step 12 in greater detail, the SOI wafer 26 is first patterned with photoresist 23 using standard lithography to define the footprint of a suspended proof mass 24 (illustrated in FIG. 2D). As illustrated in FIG. 2D, which shows step 13 of the fabrication process, a deep silicon reactive ion etch defines the structure of the suspended proof mass 24.

As is illustrated in FIG. 2E (step 14), after the silicon pattern is transferred, the silicon dioxide layer 21 in between the silicon layers is removed with an isotropic oxide etch that allows portions of the layer 21, specifically those underneath anchors and bond pads (not illustrated), to remain and hold the structure to the substrate. After the proof mass 24 and other components are released from the substrate, the entire device is coated at an angle with a metal layer system using a process that places metal 25 on the sidewalls of the structure, as illustrated in FIG. 2F (step 15). This metal is critical as it forms the contacts that the sensor uses.

Figure 3:
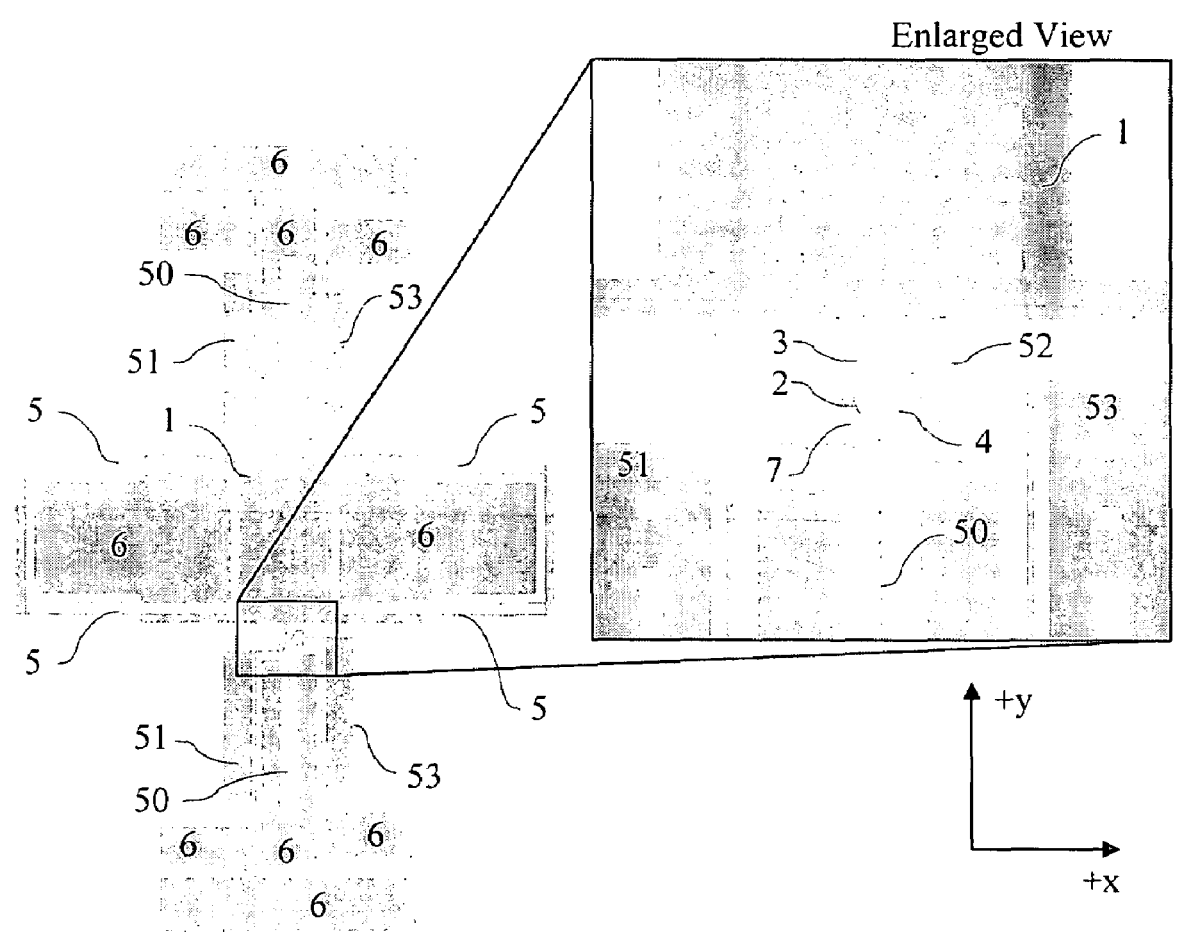
FIG. 3 is a top view of the illustrated embodiment of the sensor in its normal state and ready to sense shock extremes.
Figure 4:
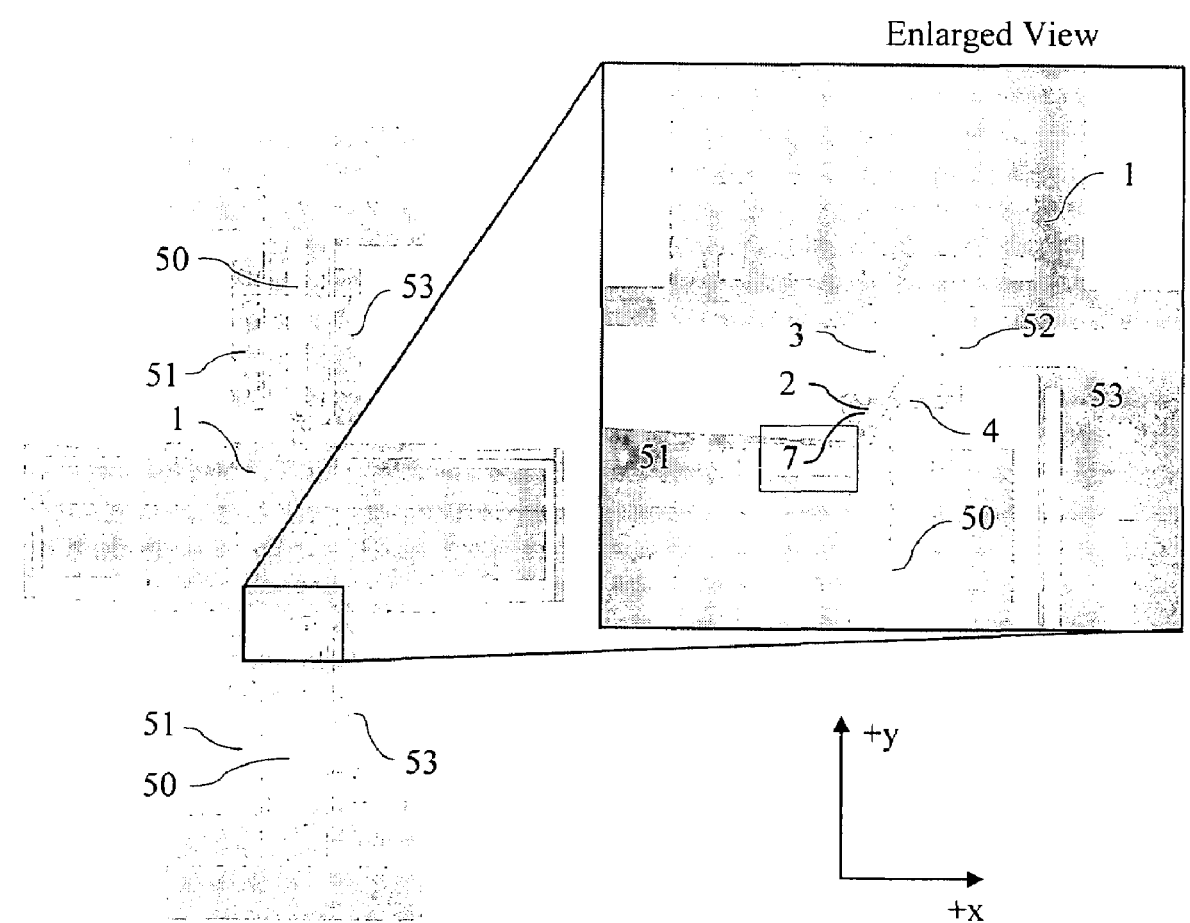
FIG. 4 is a diagram of the illustrated embodiment of the sensor in its latched and contacted state after a shock extreme has been reached.

FIG. 3 illustrates an embodiment of the invention that includes two "mirror-imaged" sets of latches/contacts on opposite sides of the proof mass 1 to monitor both positive and negative y-axis shock levels, and provides both a latch signal and a programmable trigger signal depending on the level of external shock. For example, the shock level may not be sufficient to cause the latches to engage (thus providing a "latch signal"), but may be sufficient for the contacts 2 and 7 to meet (this contact situation is discussed as a "trigger signal" for the purposes of this specification). The proof mass 1 responds to shock levels by displacing itself in the +y or -y direction. The latch 3 on the proof mass 1 is separated from the pawl 4 by a predetermined distance selected for the shock level at which the shock sensor is desired to latch. If that shock level is achieved, the proof mass 1 and latch 3 will move the distance required to engage the latch 3 with the pawl 4. A very flexible beam 50 allows the pawl 4 to move easily in a direction perpendicular to the motion of the proof mass 1, and to engage with the latch 3 which prevents the proof mass 1 from returning to its initial state. At this point, the shock sensor is in its latched state and a closed contact exists between the proof mass 1 and pawl 4. This closed contact can function to signal a microcontroller or to allow interrogation by an external reader. FIG. 4 illustrates the shock sensor in a latched state.

In addition, as is shown in FIG. 3, when the proof mass 1 is deflected by a shock, the proof mass contact 2 on the sidewall of the latch 3 may connect with contact 7. The surface of the contact sidewalls (2 and 7) are designed to provide a reliable and low-resistance contact. The contact actuator 51 connected to the contact 7 allows the distance between the contacts 2 and 7 to be varied. The contact actuator 51 achieves this by deflecting (upon the application of a current through external circuitry, not illustrated) in a direction generally perpendicular to the direction of the movement of the proof mass 1 (in the + or −x direction). This ability of the sensor to vary the distance between the contacts 2 and 7 modifies the shock level required to make contact and thus provides user programmability. When the contacts 7 connect to the latch contacts 2, a circuit can be closed that can provide a signal to a microcontroller or be interrogated by an external reader. The shock level for making a contact between the proof mass contact 2 and the contact 7 may or may not be the same as that for latching depending on the setting of the contact actuator 51. In other embodiments of the invention, the latching shock can be adjusted as well by varying the distance between the latch 3 and the pawl 4 via adjustment of the reset actuator 53 in a manner similar to that of the contact actuator 51 discussed above. Therefore, in different embodiments and applications there could be instances in which the contacts 2 and 7 make contact before latching occurs (via latch 3 and pawl 4). Conversely, there could also be instances in which latching occurs (via latch 3 and pawl 4) before the contacts 2 and 7 make contact.

The shock sensor is designed to be reset after the sensor (in its latched state) is read or used to provide a signal to an external system. As shown in FIG. 3, the invention includes a mechanical linkage 52 on the pawl 4 that creates a unique mechanical connection to a reset actuator 53. When the shock sensor is unlatched and ready to sense a shock event, the reset actuator 53 is not in contact with the mechanical linkage 52 or the pawl 4. When a shock event occurs, the latch 3 on the proof mass 1 makes contact with the pawl 4 and forces the pawl 4 to move in a direction generally perpendicular to the motion of the proof mass 1. If the shock is of sufficient magnitude, the latch 3 will push the pawl 4 until latching occurs. The mechanical linkage 52 is designed so that the reset actuator 53 does not apply a mechanical-load to the paws 4 during latching. Without such a mechanical linkage 52, the reset actuator 53 would apply a stiff resistance to the latching motion, making the sensing of low shock levels difficult. Although FIG. 3 illustrates one embodiment of such a mechanical linkage 52, other mechanical designs within the scope of the present invention would also achieve the goal of permitting latching to occur without resistance from the reset actuator 53.

While the sensor is in a latched state, as is shown in FIG. 4, the reset actuator 53 can be forced to deflect such that the reset actuator 53 engages with the mechanical linkage 52 and pulls the pawl 4 away from the latch 3. The illustrated embodiment of the invention uses for the reset actuator 53 a thermal actuator that deflects when a specific amount of current is run through the device. Once the actuator 53 is engaged with the pawl 4, the force from the reset actuator 53 will pull the pawl 4 away from the proof mass 1. When sufficient force is applied, the latch 3 and pawl 4 disengage, thereby releasing the proof mass 1 and allowing it to return to its initial position. At this point, the sensor is ready to monitor another shock event.

Figure 5:
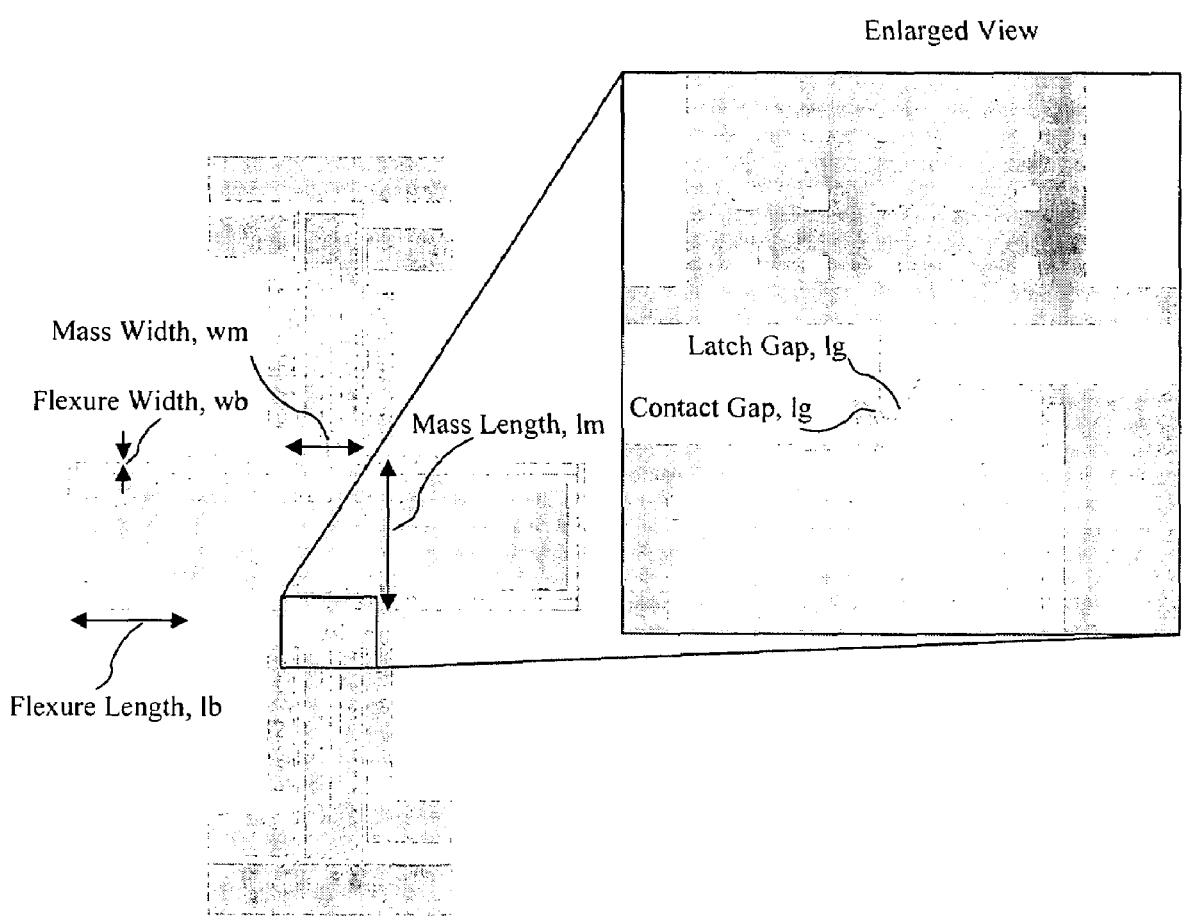
FIG. 5 shows the definition of parameters used in the design of the sensor.

FIG. 5 defines the primary parameters used to design one embodiment of the sensor to detect specific levels of shock. The mass of the proof mass defines the inertial force, and is given by the following expression:

$$m = \rho * wm * lm * t,$$

where m is the mass, $\rho$ is the density of the material, wm is the proof mass width, lm is the proof mass length, and t is the thickness of the proof mass.

The inertial force developed on the mass under acceleration is then given by:

$$F = m * a,$$

where F is the inertial force, m is the mass of the proof mass, and a is the applied acceleration.

The stiffness of the suspension provides a force against the inertial force. The stiffness is given by:

$$k = 2 * kb = \frac{2 * E * t * wb^3}{lb^3},$$

where k is the entire suspension stiffness, kb is the stiffness of one beam in the suspension, E is the Young's modulus of the material the device is made in, wb is the width of a beam in the suspension, lb is the length of a beam in the suspension, and t is the thickness of the material.

The distance the proof mass will move under the applied acceleration, neglecting the effects of the latch friction, is given by:

$$h = \frac{F}{k}$$

A device will latch if the proof mass deflection is greater than the distance of the latch gap plus the distance across the tip of the pawl, and can be expressed by the following latching condition:

$$a > \frac{k * (lg + lp)}{m}$$

Table 1 below contains the shock levels required for latching the sensor given a set of design parameters and a material thickness of 100 μm and a latching gap of 7 μm.

TABLE 1

Table of design parameters versus shock trigger levels

| Shock Level | Flexure Width, wb | Flexure Length, lb | Proof Mass Width, wm | Proof Mass Length, lm |
|---|---|---|---|---|
| 20 g | 3.5 μm | 800 μm | 1500 μm | 1100 μm |
| 250 g | 5 μm | 800 μm | 515 μm | 515 μm |
| 500 g | 6.5 μm | 800 μm | 545 μm | 545 μm |
| 1000 g | 8.5 μm | 800 μm | 581 μm | 581 μm |

In one embodiment of the invention, the shock sensor is used to wake up a microcontroller in an embedded sensing application. In other embodiments, the device is used in standalone applications where the sensor is connected to an RFID tag or other transmitter for remote determination of the shock environment experienced by shipping containers and products. Similar devices for other environmental variables such as temperature, humidity, and chemical concentrations can be developed using the principles disclosed herein.

Figure 6:
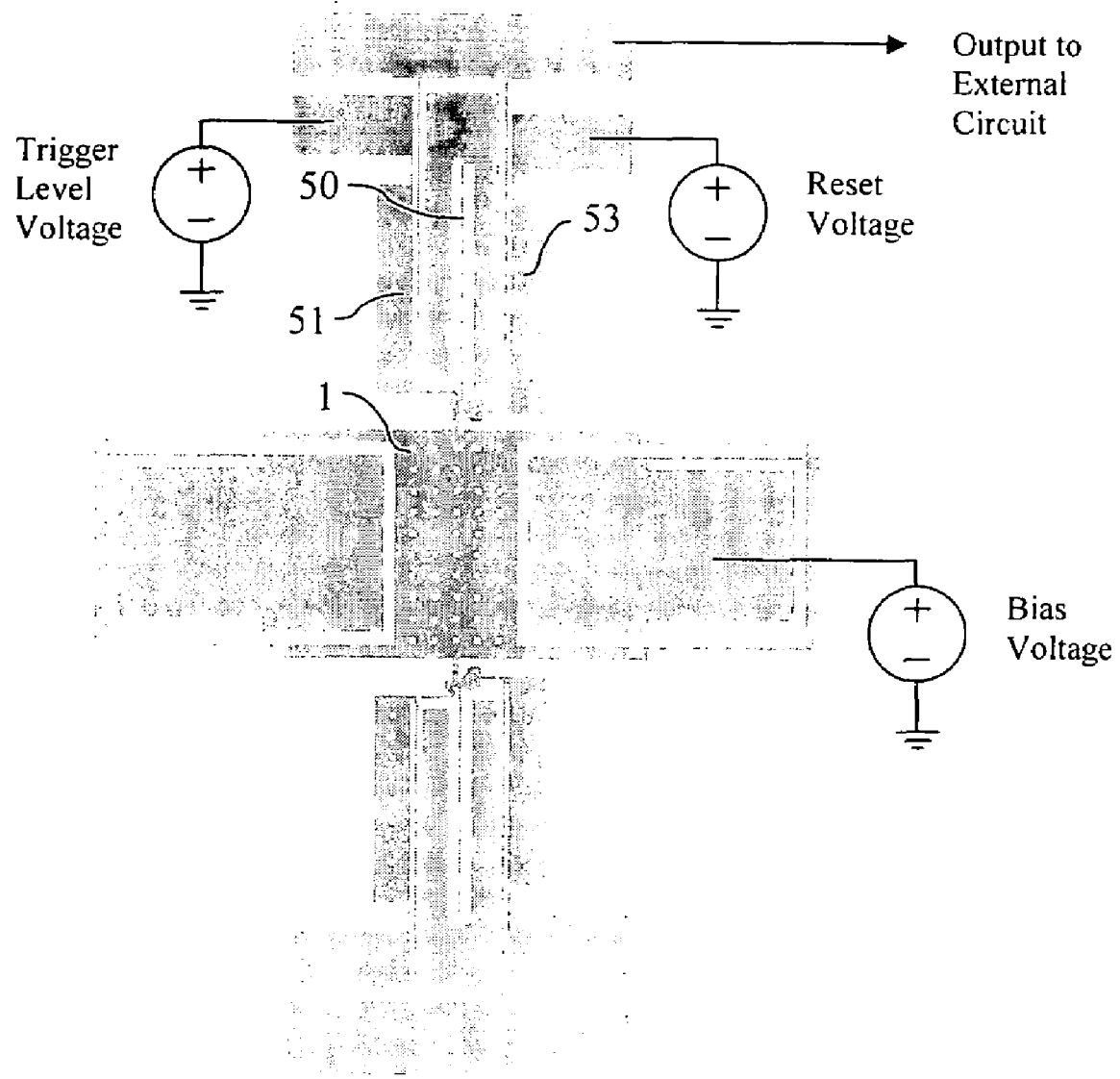
FIG. 6 is a diagram of electrical interconnection of the sensor.

FIG. 6 illustrates a wiring schematic for an embodiment of the invention that is used for waking up an embedded microcontroller from a sleep mode when a certain shock level is experienced. In this embodiment, a voltage difference is applied across actuators 53 and 51. In operation a single bias signal is applied to the proof mass 1 of the device. The bias signal could be a voltage or current depending upon the type of readout circuit used. Connections to the external contacts and pawls would be outputs to which the bias signal is connected. These outputs could be connected to microcontroller interrupt lines, to a wireless transceiver, to a large circuit network that performs some function, or a number of other connection and circuits.

Although several embodiments and forms of this invention have been illustrated, it is apparent that those skilled in the art can make other various modifications and embodiments of the invention without departing from the scope and spirit of the present invention. For example, other configurations of the sensor are possible that utilize varying surface features on the contacts, multiple movable contacts, and different actuator types.

Figure 7:
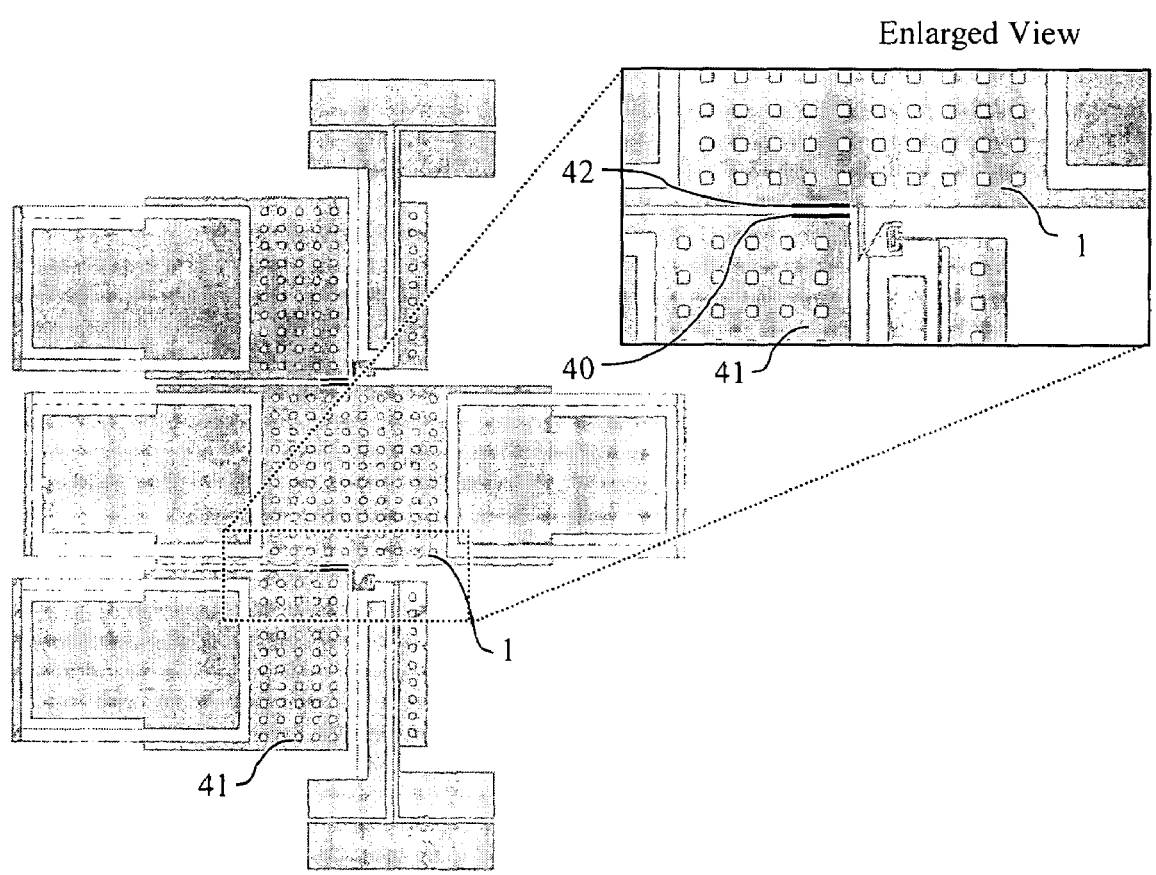
FIG. 7 shows an embodiment of the invention with shock sensitive contacts that allow operation at lower shock levels.

One particular embodiment of the invention, shown in FIG. 7, uses the sidewall 40 of a second proof mass 41 as a moving contact to connect with the contact 42 on the sensor's main latching proof mass 1. When a shock load is applied, the moving contact 41 will move out of the way of the main proof mass 1 during the latching operation, thereby reducing the amount of force required to meet the latching condition. After the latching occurs and the shock load is removed from the device, the moving contact 41 will return to its original position and make a connection with the contact 42 on the device's main latching proof mass 1. This configuration is useful when designing low shock trigger devices where the inertial force may be insufficient to overcome the retarding force created by the stationary electrical contacts.

Figure 8:
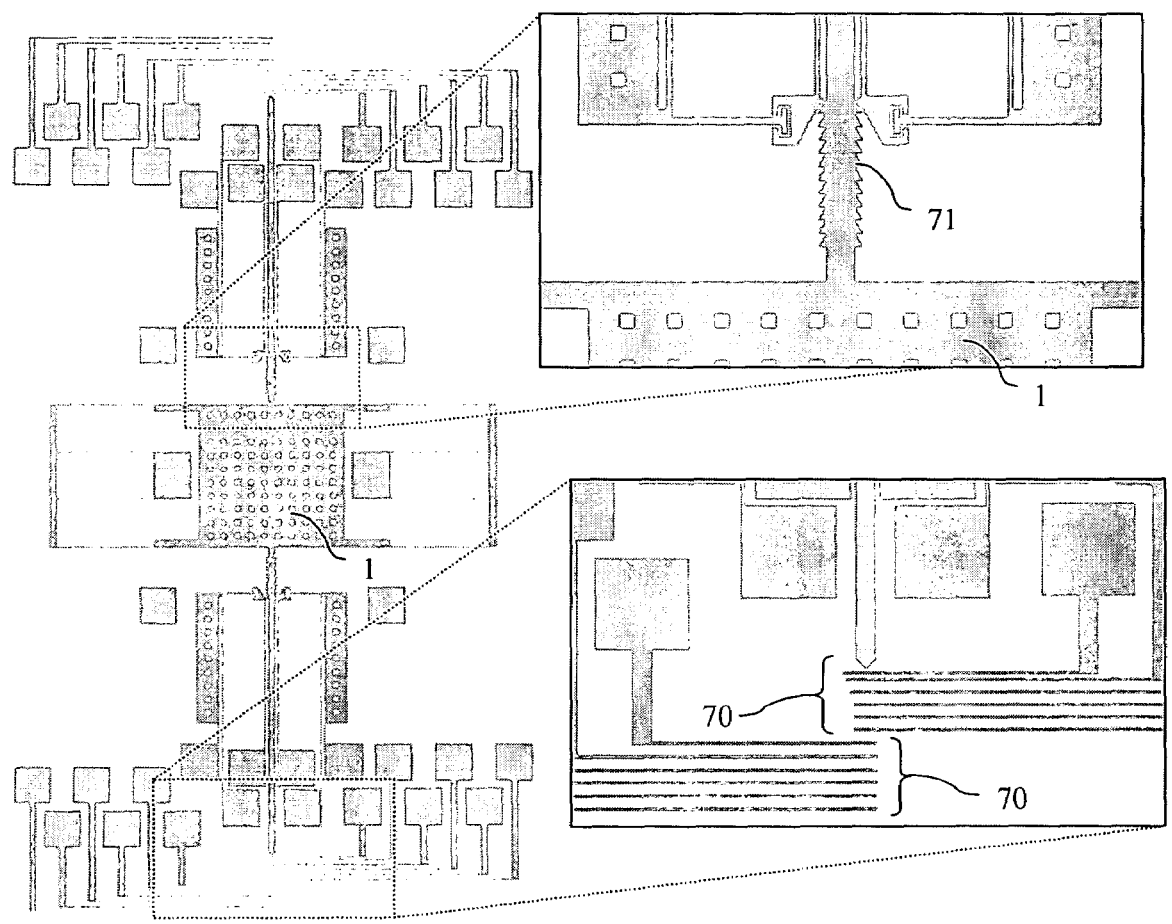
FIG. 8 shows an embodiment of the invention with multiple contacts for detection of multiple shock levels.

Another embodiment, shown in FIG. 8, includes multiple contacts 70 and multiple latches 71 to allow one sensor device to trigger at and latch at multiple shock levels that the proof mass 1 is subjected to.

Another embodiment of the device (not illustrated) uses a capacitive actuator for reset functions instead of a thermal actuator. A capacitive actuator consumes less power but would be suitable only for lower force and lower shock level applications. The configuration would require additional capacitive actuators on the proof mass to move it out of contact with the pawl, thereby eliminating the friction that holds the pawl in contact with the latch. Only then could another capacitive actuator move the pawl out of position, after which the actuator on the proof mass is released, followed by the release of the pawl, at which point the sensor is unlatched and ready for another sensing operation.

Furthermore, other fabrication processes for the device are possible. Any fabrication process that realizes a single thick micromechanical structural layer with 1) conducting sidewalls that can make electrical contact, and 2) large amounts of suspended inertial mass. Examples include bulk micromachining and wafer-bonding fabrication approaches in silicon, silicon dioxide, nickel, titanium and other conductors, as well as LIGA-type fabrication processes using electroplated metals.

This invention may be provided in other specific forms and embodiments without departing from the essential characteristics as described herein. The embodiment described is to be considered in all aspects as illustrative only and not restrictive in any manner. The following claims rather than the foregoing description indicate the scope of the invention.

As described above and shown in the associated drawings, the present invention comprises a micro-electromechanical shock sensor. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A micro-electromechanical shock sensor device, comprising:
    a moveable proof mass comprising
        a first mechanical latch and
        a first electrical contact; and
    a pawl comprising a second mechanical latch, the second mechanical latch disposed at a latching distance from the first mechanical latch, the latching distance corresponding to a latching threshold shock level; and
    a second electrical contact disposed at an electrical contact distance from the first electrical contact, the electrical contact distance corresponding to an electrical contact threshold shock level;
    wherein the first mechanical latch moves toward the second mechanical latch and the first electrical contact moves toward the second electrical contact when the proof mass experiences a shock level in the direction of the latching threshold shock level; and
    wherein the first mechanical latch engages with the second mechanical latch when the shock level reaches the latching threshold shock level; and
    wherein the first electrical contact contacts with the second electrical contact when the shock level reaches the electrical contact threshold shock level.

2. The micro-electromechanical shock sensor device of claim 1, in which the first electrical contact contacts with the second electrical contact before the first mechanical latch engages with the second mechanical latch.

3. The micro-electromechanical shock sensor device of claim 1, further comprising an unlatching means to release the second mechanical latch from the first mechanical latch.

4. The micro-electromechanical shock sensor device of claim 3, wherein the unlatching means comprises a first actuator mechanically coupled to the pawl.

5. The micro-electromechanical shock sensor device of claim 1, further comprising a first actuator mechanically coupled to the pawl for unlatching the first mechanical latch from the second mechanical latch.

6. The micro-electromechanical shock sensor device of claim 5, wherein the first actuator is electromechanically linked to the pawl for moving the second mechanical latch thereby varying the latching distance.

7. The micro-electromechanical shock sensor device of claim 5, further comprising a second actuator electromechanically linked to the second electrical contact for moving the second electrical contact thereby varying the electrical contact distance.

8. The micro-electromechanical shock sensor device of claim 5, wherein the first actuator does not engage the pawl during latching.

9. The micro-electromechanical shock sensor device of claim 5, wherein the first actuator does not apply a mechanical load onto the pawl during latching.

10. The micro-electromechanical shock device of claim 5, wherein the first actuator engages the pawl for unlatching the second mechanical latch from the first mechanical latch.

11. The micro-electromechanical shock sensor device of claim 5, wherein the first actuator comprises a thermal actuator.

12. The micro-electromechanical shock sensor device of claim 5, wherein the second actuator comprises a thermal actuator.

13. The micro-electromechanical shock sensor device of claim 5, wherein the first actuator comprises a capacitive actuator.

14. The micro-electromechanical shock sensor device of claim 7, wherein the second actuator comprises a capacitive actuator.

15. The micro-electromechanical shock sensor device of claim 5, wherein the latching distance is about 7 microns.

16. The micro-electromechanical shock sensor device of claim 5, wherein the proof mass has a length of between 500 and 1200 microns, a width of between 500 and 1500 microns, and a thickness of between 80 and 120 microns.

17. The micro-electromechanical shock sensor device of claim 5, wherein the proof mass further comprises
  a third mechanical latch;
  a third electrical contact;
  a fourth mechanical latch; and
  a fourth electrical contact;
  wherein the third mechanical latch, the third electrical contact, the fourth mechanical latch, and the fourth electrical contact are fabricated in mirror-imaged locations on the opposite side of the proof mass to the first mechanical latch, the first electrical contact, the second mechanical latch, and the second electrical contact, in order for the device to detect shock in a negative as well as a positive direction.

18. A micro-electromechanical shock sensor device, comprising:
  a first moveable proof mass comprising
    a first mechanical latch and
    a first electrical contact; and
  a pawl comprising a second mechanical latch, the second mechanical latch disposed at a latching distance from the first mechanical latch, the latching distance corresponding to a latching threshold shock level; and
  wherein the first mechanical latch moves toward the second mechanical latch when the proof mass experiences a shock level in the direction of the latching threshold shock level; and
  wherein the first mechanical latch engages with the second mechanical latch when the shock level reaches the latching threshold shock level; and
  a second moveable proof mass comprising a second electrical contact positioned so as to make an electrical contact with the first electrical contact after the first and second mechanical latches have latched.

19. A micro-electromechanical shock sensor device, comprising:
  a moveable proof mass comprising
    a plurality of latches disposed at a plurality of latching distances from at least one holding latch, the plurality of latching distances corresponding to a plurality of latching shock levels, and
    a first electrical contact; and
  at least one pawl comprising the at least one holding latch; and
  a plurality of second electrical contacts disposed at a plurality of electrical contact distances from the first electrical contact, the plurality of electrical contact distances corresponding to a plurality of electrical contact shock levels;
  wherein the plurality of latches moves toward the at least one holding latch and the first electrical contact moves toward the plurality of electrical contacts when the proof mass experiences a shock level in the direction of the plurality of contact shock levels; and
  wherein at least one of the plurality of latches engages with at least one holding latch when the shock level reaches any of the plurality of latching shock levels; and
  wherein the first electrical contact contacts with at least one of the plurality of electrical contacts when the shock level reaches the plurality of electrical contact shock levels.

20. The micro-electromechanical shock sensor device of claim 19, further comprising at least one actuator mechanically coupled to the at least one pawl for unlatching the at least one holding latch from the plurality of latches.

21. The micro-electromechanical shock sensor device of claim 20, wherein the at least one actuator does not engage the at least one pawl during latching.

22. The micro-electromechanical shock sensor device of claim 20, wherein the at least one actuator does not apply a mechanical load onto the at least one pawl during latching.

23. The micro-electromechanical shock sensor device of claim 20, wherein the at least one actuator is a thermal actuator.

24. The micro-electromechanical shock sensor device of claim 20, wherein the at least one actuator is a capacitive actuator.

25. A method for sensing shock using a micro-electromechanical device, comprising the steps of:
  fabricating a micro-electromechanical shock sensor device, comprising:
    a moveable proof mass comprising
      a first mechanical latch and
      a first electrical contact; and
    a pawl comprising a second mechanical latch, the second mechanical latch disposed at a latching distance from the first mechanical latch, the latching distance corresponding to a latching threshold shock level; and
    a second electrical contact disposed at an electrical contact distance from the first electrical contact, the electrical contact distance corresponding to an electrical contact threshold shock level;
    wherein the first mechanical latch moves toward the second mechanical latch and the first electrical contact moves toward the second electrical contact when the proof mass experiences a shock level in the direction of the latching threshold shock level; and
    wherein the first mechanical latch engages with the second mechanical latch when the shock level reaches the latching threshold shock level; and
    wherein the first electrical contact contacts with the second electrical contact when the shock level reaches the electrical contact threshold shock level; and
  installing the sensor in a location in which shock is desired to be monitored.

* * * * *

UNITED STATES PATENT AND TRADEMARK OFFICE
CERTIFICATE OF CORRECTION

PATENT NO. : 7,266,988 B2 Page 1 of 11
APPLICATION NO. : 11/201485
DATED : September 11, 2007
INVENTOR(S) : Michael Scott Kranz and Arthur Anthony Jenkins It is certified that error appears in the above-identified patent and that said Letters Patent is hereby corrected as shown below:

The Title Page, showing an illustrative figure, should be deleted and substitute therefor the attached Title Page.

Signed and Sealed this

Fifteenth Day of January, 2008

JON W. DUDAS
*Director of the United States Patent and Trademark Office*

(12) United States Patent (10) Patent No.: US 7,266,988 B2
Kranz et al. (45) Date of Patent: *Sep. 11, 2007

(54) RESETTABLE LATCHING MEMS SHOCK SENSOR APPARATUS AND METHOD

(75) Inventors: Michael S. Kranz, Madison, AL (US); Arthur A. Jenkins, Madison, AL (US)

(73) Assignee: Morgan Research Corporation, Huntsville, AL (US)

( * ) Notice: Subject to any disclaimer, the term of this patent is extended or adjusted under 35 U.S.C. 154(b) by 200 days.

This patent is subject to a terminal disclaimer.

(21) Appl. No.: 11/201,485

(22) Filed: Aug. 11, 2005

(65) Prior Publication Data
US 2006/0220803 A1 Oct. 5, 2006

Related U.S. Application Data

(60) Provisional application No. 60/619,496, filed on Oct. 15, 2004.

(51) Int. Cl.
G01M 7/00 (2006.01)
G01N 3/30 (2006.01)
G01N 3/32 (2006.01)
G01P 15/00 (2006.01)

(52) U.S. Cl. .................................... 73/12.01
(58) Field of Classification Search ............. 73/12.01, 73/504.04, 514.32
See application file for complete search history.

(56) References Cited

U.S. PATENT DOCUMENTS

| 5,326,945 | A | | 7/1994 | Gotoh et al. | |
|---|---|---|---|---|---|
| 5,339,071 | A | | 8/1994 | Eckhaus | |
| 5,506,568 | A | | 4/1996 | Chen | |
| 5,970,794 | A | | 10/1999 | Yoshida | |
| 6,148,670 | A | * | 11/2000 | Judy | 73/514.32 |
| 6,314,887 | B1 | | 11/2001 | Robinson | 102/262 |
| 6,514,781 | B2 | | 2/2003 | Chang et al. | 438/19 |
| 6,549,107 | B2 | | 4/2003 | Lim et al. | 335/78 |
| 6,619,123 | B2 | | 9/2003 | Gianchandani et al. | |
| 6,737,979 | B1 | * | 5/2004 | Smith et al. | 340/665 |
| 7,038,150 | B1 | * | 5/2006 | Polosky et al. | 200/61.45 R |
| 7,148,436 | B1 | * | 12/2006 | Lee et al. | 200/61.48 |
| 7,159,442 | B1 | * | 1/2007 | Jean | 73/12.01 |
| 7,194,889 | B1 | * | 3/2007 | Jean et al. | 73/12.04 |
| 2003/0020062 | A1 | | 1/2003 | Faris | 257/40 |
| 2005/0146504 | A1 | * | 7/2005 | Huang et al. | 345/163 |

OTHER PUBLICATIONS

Geear et al, Microengineered Electrically Resettable Circuit Breaker, Journal of Microelectromechanical Systems, vol. 13, No. 6, Dec. 2004.*

* cited by examiner

Primary Examiner—Michael Cygan
Assistant Examiner—Octavia Davis
(74) Attorney, Agent, or Firm—Paul F. McQuade; Greenberg Traurig, LLP

(57) ABSTRACT

The Resettable Latching MEMS Shock Sensor provides the capability of recording external shock extremes without consuming electrical power. The device incorporates a shock sensitive suspended proof mass, spring-loaded contacts, latches, and actuators for device reset. The device can be designed, hardwired, or programmed to trigger at various shock levels. The device can be fabricated in a simple micromachining process that allows its size to be miniaturized for embedded and portable applications. During operation, the device consumes no quiescent power. The device can be configured to close a circuit, switch an interrupt signal, or switch some other electrical trigger signal between devices at the time of a shock extreme being reached, or it can be configured to latch and be polled at some time after the shock limit has occurred.

25 Claims, 9 Drawing Sheets

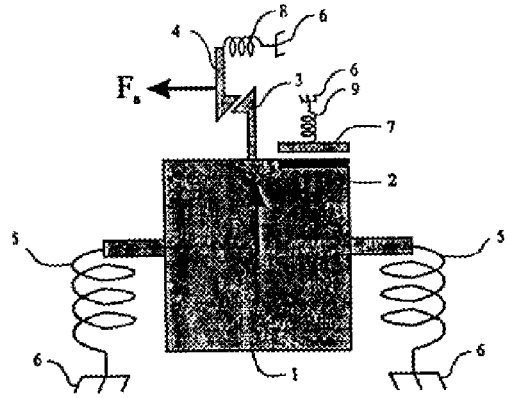

UNITED STATES PATENT AND TRADEMARK OFFICE
CERTIFICATE OF CORRECTION

PATENT NO.       : 7,266,988 B2                                  Page 3 of 11
APPLICATION NO.  : 11/201485
DATED            : September 11, 2007
INVENTOR(S)      : Michael Scott Kranz and Arthur Anthony Jenkins It is certified that error appears in the above-identified patent and that said Letters Patent is hereby corrected as shown below:

In the drawings, sheet 1, Fig. 1, please replace with the following:

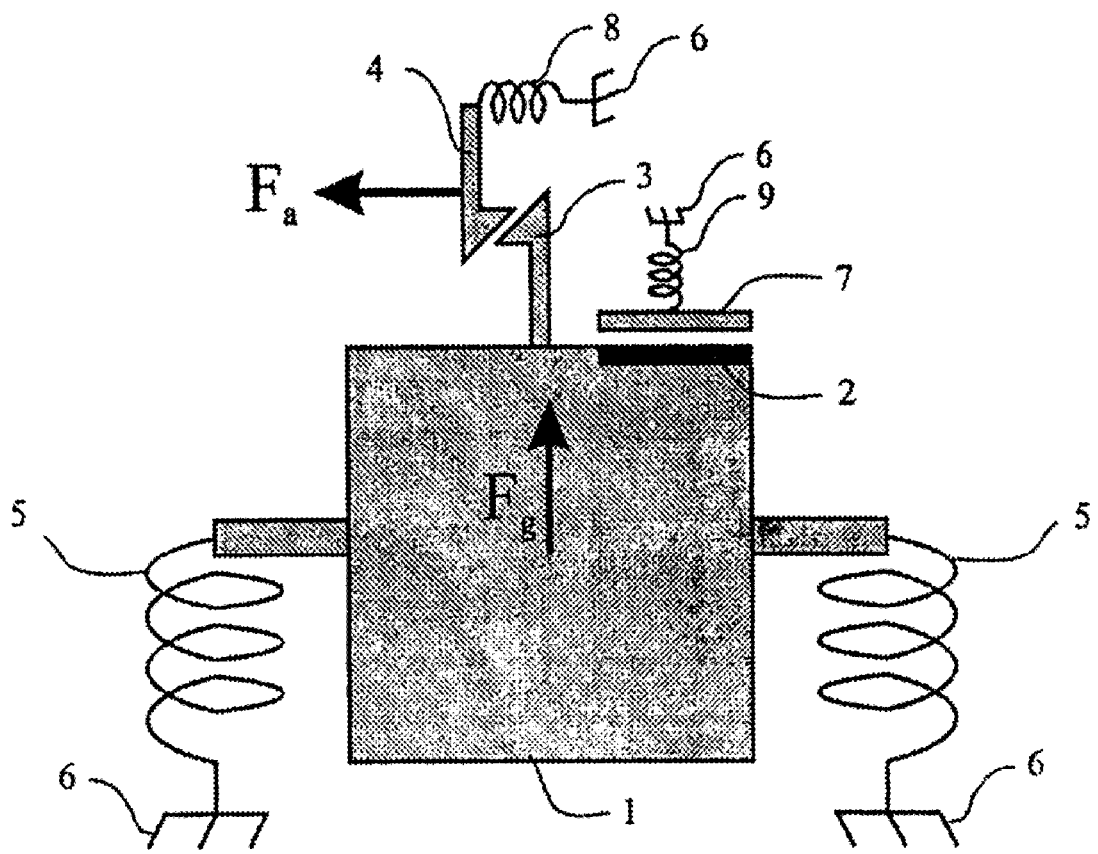

Figure 1

UNITED STATES PATENT AND TRADEMARK OFFICE
CERTIFICATE OF CORRECTION

PATENT NO. : 7,266,988 B2
APPLICATION NO. : 11/201485
DATED : September 11, 2007
INVENTOR(S) : Michael Scott Kranz and Arthur Anthony Jenkins It is certified that error appears in the above-identified patent and that said Letters Patent is hereby corrected as shown below:

In the drawings, sheet 2, Fig. 2A, please replace with the following:

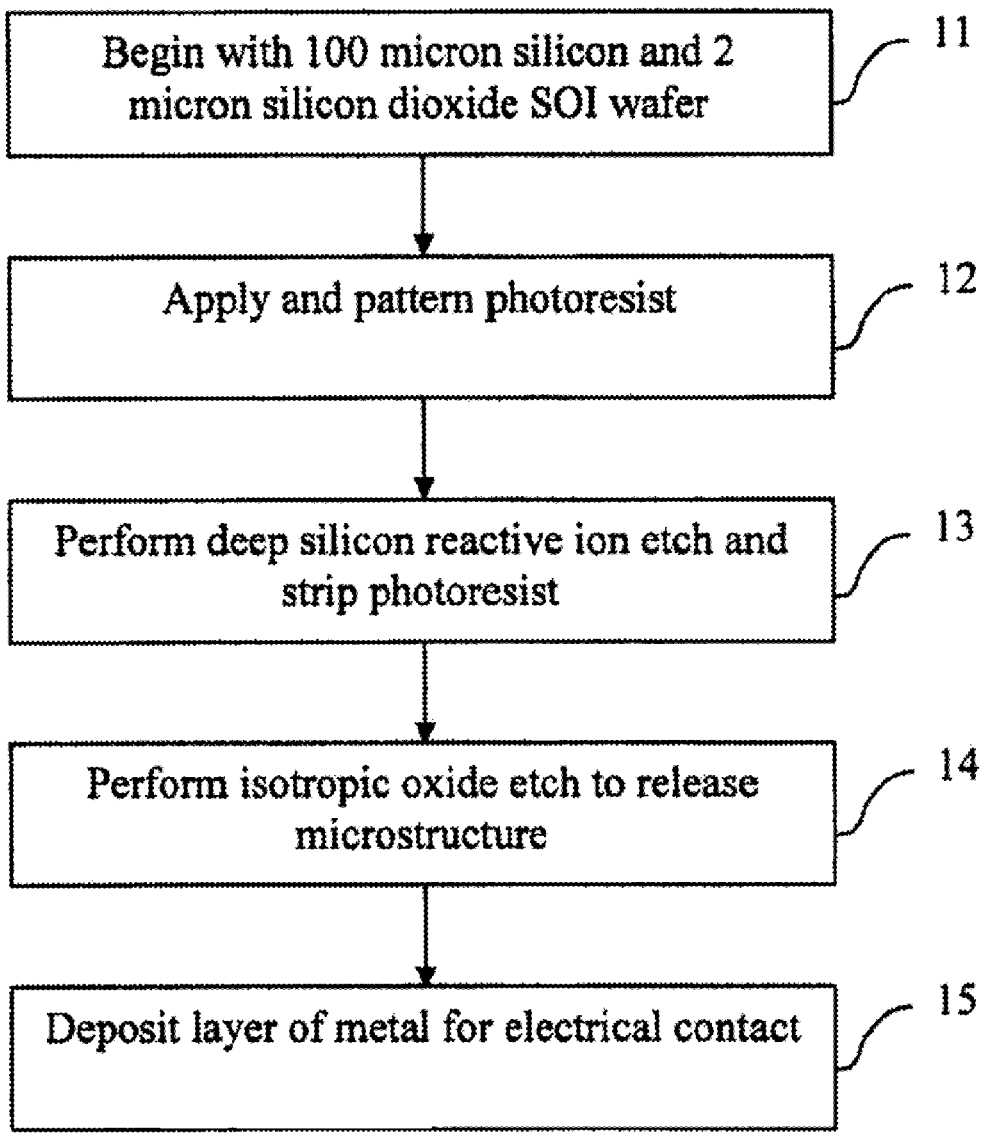

Figure 2A

UNITED STATES PATENT AND TRADEMARK OFFICE
CERTIFICATE OF CORRECTION

PATENT NO. : 7,266,988 B2  Page 5 of 11
APPLICATION NO. : 11/201485
DATED : September 11, 2007
INVENTOR(S) : Michael Scott Kranz and Arthur Anthony Jenkins It is certified that error appears in the above-identified patent and that said Letters Patent is hereby corrected as shown below:

In the drawings, sheet 3, Fig. 2B-2F, please replace with the following:

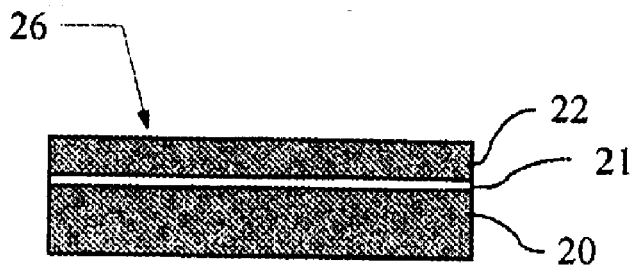

Figure 2B

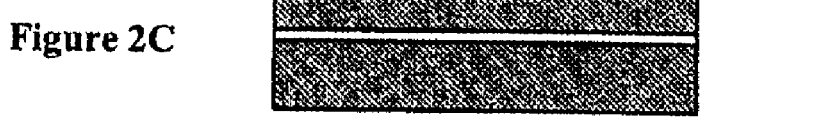

Figure 2C

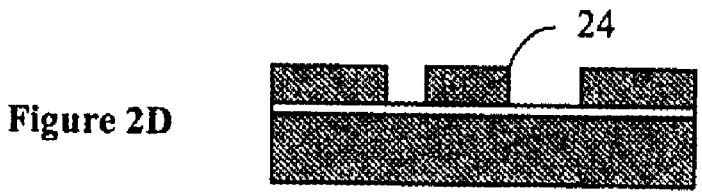

Figure 2D

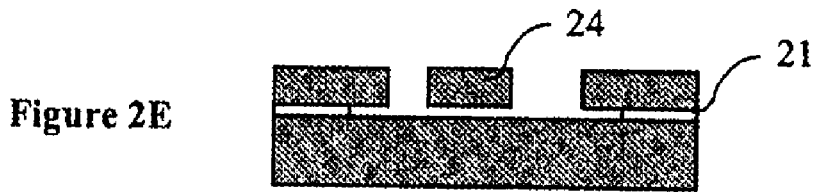

Figure 2E

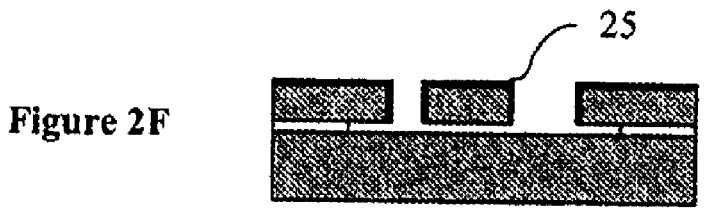

Figure 2F

Figure 2B-2F

UNITED STATES PATENT AND TRADEMARK OFFICE
CERTIFICATE OF CORRECTION

PATENT NO.        : 7,266,988 B2
APPLICATION NO.   : 11/201485
DATED             : September 11, 2007
INVENTOR(S)       : Michael Scott Kranz and Arthur Anthony Jenkins It is certified that error appears in the above-identified patent and that said Letters Patent is hereby corrected as shown below:

In the drawings, sheet 4, Fig. 3, please replace with the following:

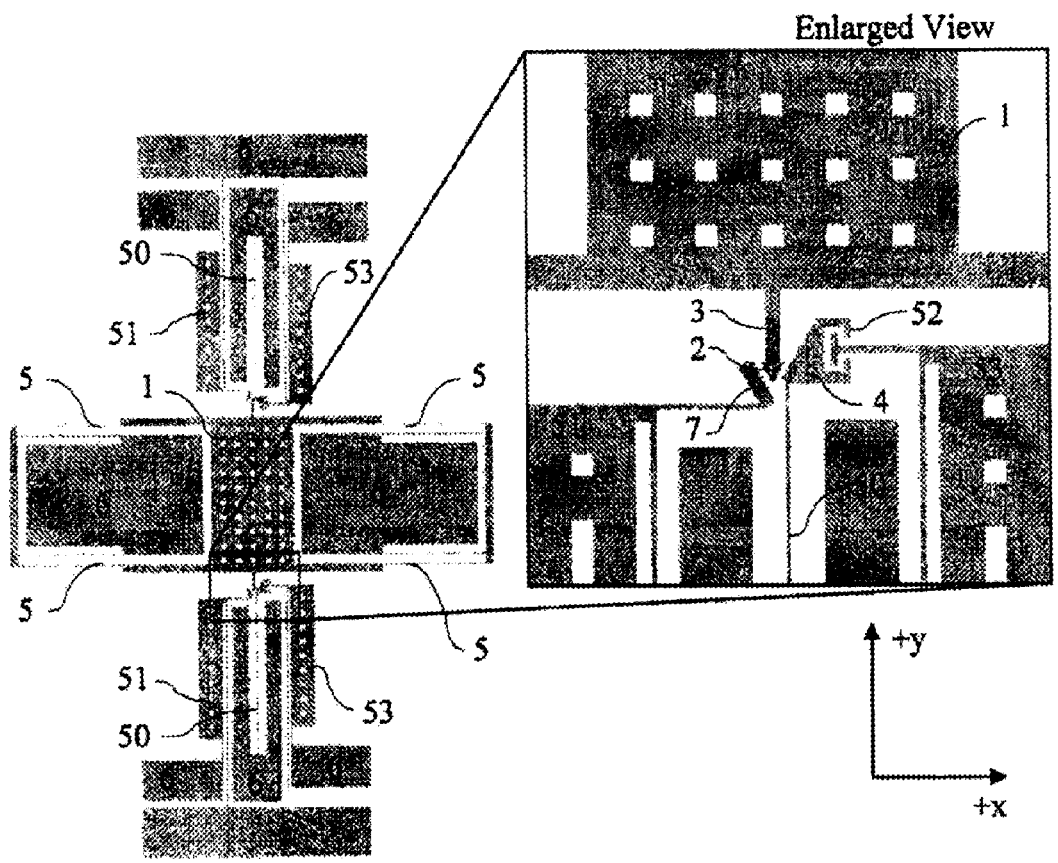

Figure 3

UNITED STATES PATENT AND TRADEMARK OFFICE
CERTIFICATE OF CORRECTION

| | | |
|---|---|---|
| PATENT NO. | : 7,266,988 B2 | Page 7 of 11 |
| APPLICATION NO. | : 11/201485 | |
| DATED | : September 11, 2007 | |
| INVENTOR(S) | : Michael Scott Kranz and Arthur Anthony Jenkins | |

It is certified that error appears in the above-identified patent and that said Letters Patent is hereby corrected as shown below:

In the drawings, sheet 5, Fig. 4, please replace with the following:

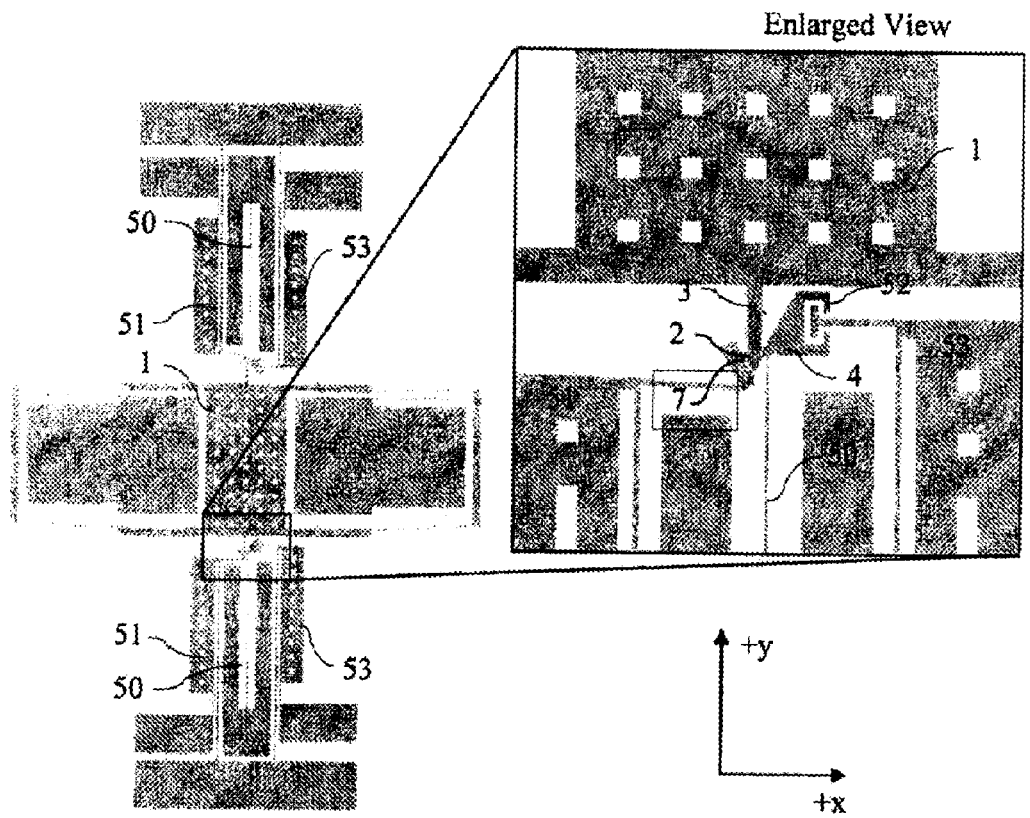

Figure 4

UNITED STATES PATENT AND TRADEMARK OFFICE
CERTIFICATE OF CORRECTION

PATENT NO.        : 7,266,988 B2
APPLICATION NO. : 11/201485
DATED             : September 11, 2007
INVENTOR(S)       : Michael Scott Kranz and Arthur Anthony Jenkins It is certified that error appears in the above-identified patent and that said Letters Patent is hereby corrected as shown below:

In the drawings, sheet 6, Fig. 5, please replace with the following:

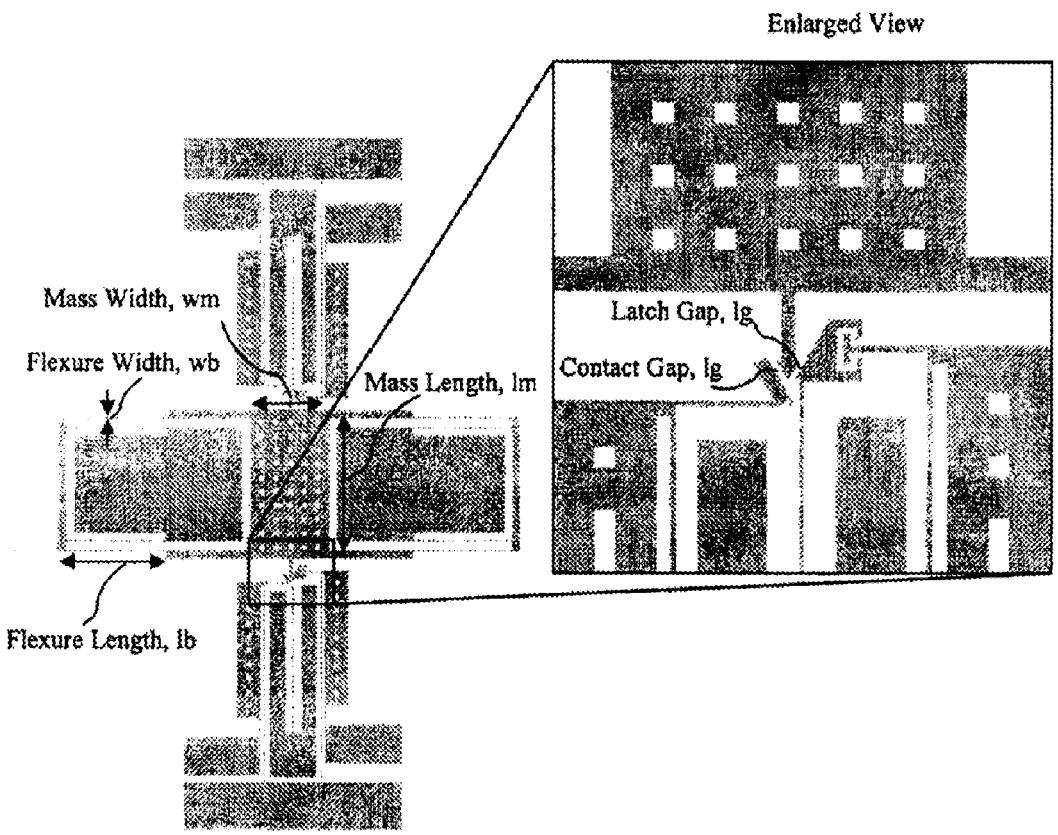

Figure 5

UNITED STATES PATENT AND TRADEMARK OFFICE
CERTIFICATE OF CORRECTION

PATENT NO. : 7,266,988 B2
APPLICATION NO. : 11/201485
DATED : September 11, 2007
INVENTOR(S) : Michael Scott Kranz and Arthur Anthony Jenkins It is certified that error appears in the above-identified patent and that said Letters Patent is hereby corrected as shown below:

In the drawings, sheet 7, Fig. 6, please replace with the following:

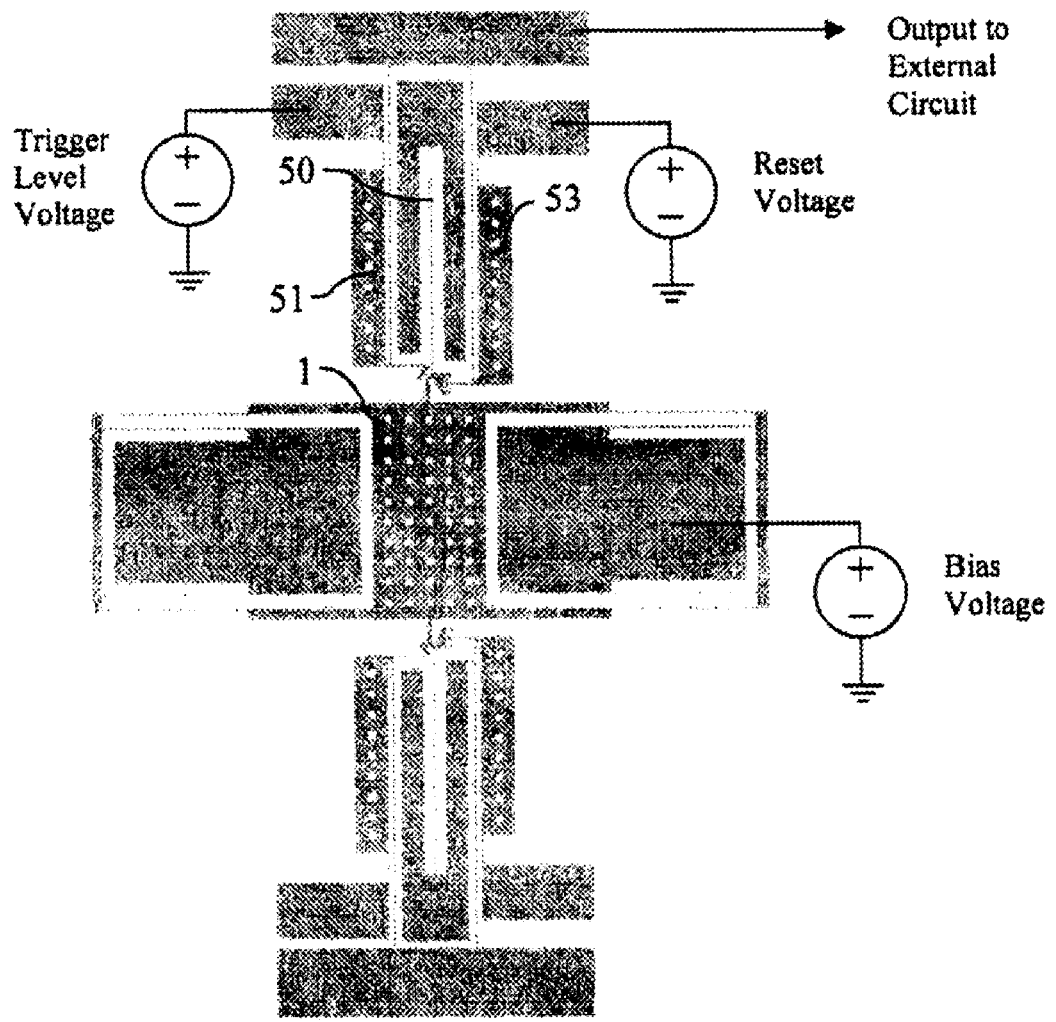

Figure 6

UNITED STATES PATENT AND TRADEMARK OFFICE
CERTIFICATE OF CORRECTION

| | |
|---|---|
| PATENT NO. | : 7,266,988 B2 |
| APPLICATION NO. | : 11/201485 |
| DATED | : September 11, 2007 |
| INVENTOR(S) | : Michael Scott Kranz and Arthur Anthony Jenkins |

It is certified that error appears in the above-identified patent and that said Letters Patent is hereby corrected as shown below:

In the drawings, sheet 8, Fig. 7, please replace with the following:

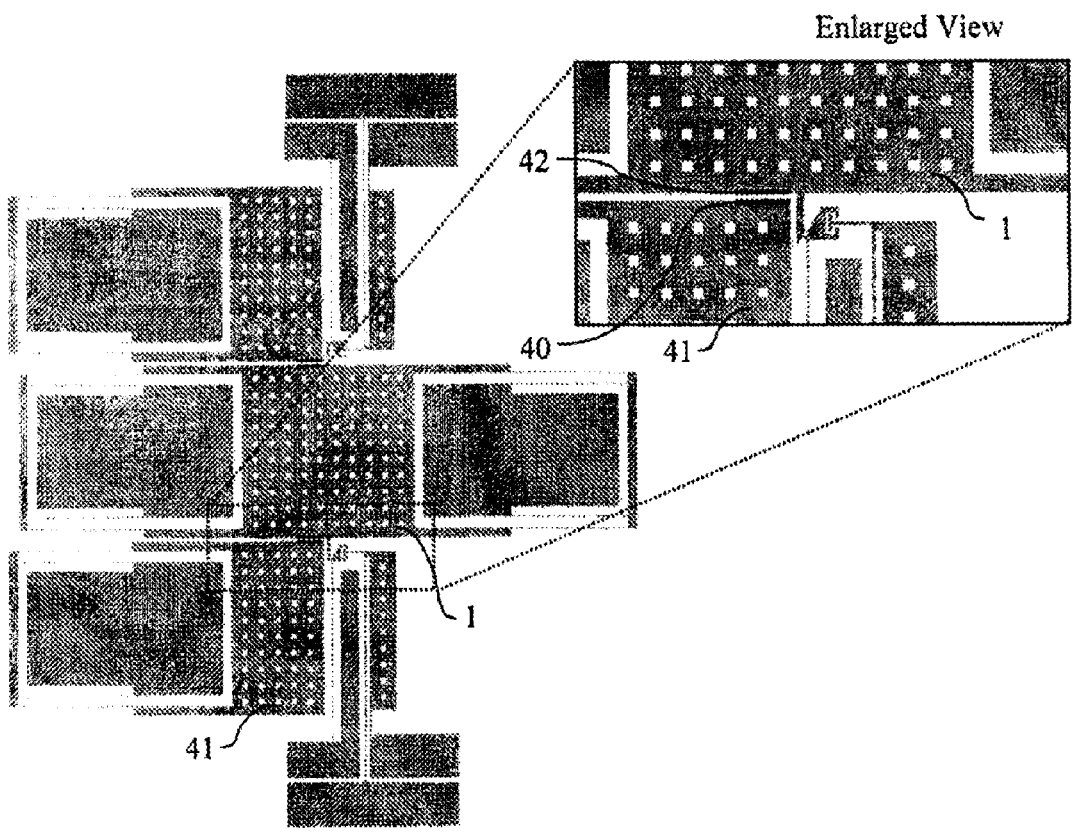

Figure 7

UNITED STATES PATENT AND TRADEMARK OFFICE
CERTIFICATE OF CORRECTION

| | | |
|---|---|---|
| PATENT NO. | : 7,266,988 B2 | Page 11 of 11 |
| APPLICATION NO. | : 11/201485 | |
| DATED | : September 11, 2007 | |
| INVENTOR(S) | : Michael Scott Kranz and Arthur Anthony Jenkins | |

It is certified that error appears in the above-identified patent and that said Letters Patent is hereby corrected as shown below:

In the drawings, sheet 9, Fig. 8, please replace with the following:

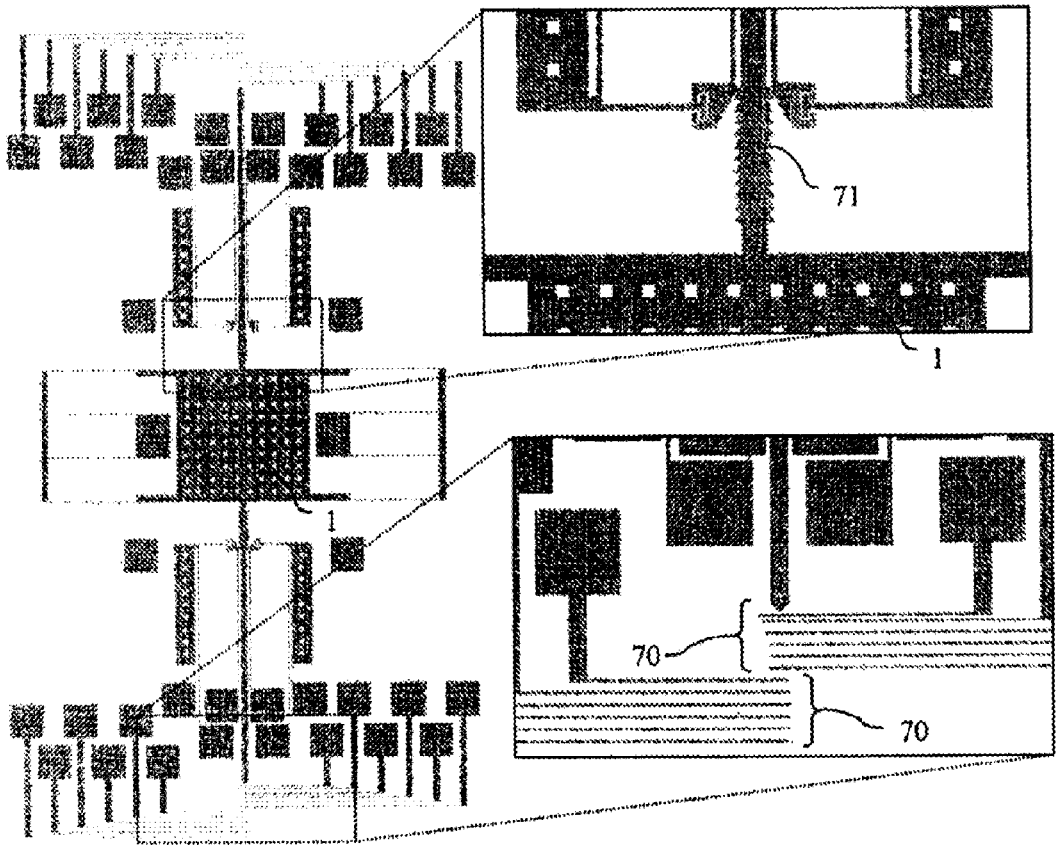

Figure 8